US012553454B2

(12) United States Patent
Shah et al.

(10) Patent No.: US 12,553,454 B2
(45) Date of Patent: Feb. 17, 2026

(54) MANIFOLD SYSTEM FOR 2oo3 CONFIGURATION

(71) Applicant: ROTEX AUTOMATION LIMITED, Vadodara (IN)

(72) Inventors: Nirav Shah, Vadodara (IN); Rajesh Shah, Vadodara (IN)

(73) Assignee: ROTEX AUTOMATION LIMITED, Vadodara (IN)

( * ) Notice: Subject to any disclaimer, the term of this patent is extended or adjusted under 35 U.S.C. 154(b) by 195 days.

(21) Appl. No.: 18/559,416

(22) PCT Filed: May 7, 2022

(86) PCT No.: PCT/IB2022/054244
§ 371 (c)(1),
(2) Date: Nov. 7, 2023

(87) PCT Pub. No.: WO2022/234546
PCT Pub. Date: Nov. 10, 2022

(65) Prior Publication Data
US 2024/0240656 A1    Jul. 18, 2024

(30) Foreign Application Priority Data
May 7, 2021  (IN) .............................. 202121020843

(51) Int. Cl.
*F15B 20/00*    (2006.01)
*F16K 31/06*    (2006.01)

(52) U.S. Cl.
CPC .......... *F15B 20/00* (2013.01); *F16K 31/0606* (2013.01)

(58) Field of Classification Search
CPC ....................... F15B 20/00; F15B 2211/30565
See application file for complete search history.

(56) References Cited

U.S. PATENT DOCUMENTS 8,302,627 B2 * 11/2012 Stretch .................. F15B 13/042
137/596.14

FOREIGN PATENT DOCUMENTS

IN    201721020387 A    12/2018

OTHER PUBLICATIONS

International Search Report from International Application No. PCT/IB2022/054244 mailed Jul. 20, 2022.
Advanced Redundant Control System (ARCS) Direct Acting Platform—141 Series, ASCO Valves, IM_IND-536661-Rev AA, [ [retrieved on Jul. 13, 2022], retrieved from < https://www.emerson.com/documents/automation/safety-manual-arcs-en-5312328.pdf (ASCO Valves; Dec. 1, 2018) p. 14-p. 21; figures 7-10.

* cited by examiner

*Primary Examiner* — Michael R Reid
(74) *Attorney, Agent, or Firm* — Shih IP Law Group, PLLC (57) ABSTRACT

A manifold system 100 with 2oo3 configuration is disclosed having three solenoid valves 102 and two shuttle valves 108 operatively coupled to the three solenoid valves 102. The manifold system 100 includes an external pilot operated logic control valve 116 operatively coupled to the two of the three solenoid valves 102 and to at least one of the shuttle valves 108 to provide 2oo3 configuration.

10 Claims, 8 Drawing Sheets

MANIFOLD SYSTEM FOR 2oo3 CONFIGURATION

TECHNICAL FIELD

The present disclosure relates generally to a manifold system with solenoid valves, and more particularly to an arrangement of solenoid valves providing 2oo3 configuration in instrumentation and process control systems of a plant.

BACKGROUND

Background description includes information that may be useful in understanding the present invention. It is not an admission that any of the information provided herein is prior art or relevant to the presently claimed invention, or that any publication specifically or implicitly referenced is prior art.

Safety Instrumentation Systems (SIS) are used to monitor the condition of values and parameters of a plant within the operational limits and, when risk conditions occur, they must trigger alarms and place the plant in a safe condition or even at the shutdown condition.

Thus, the Safety Instrumented Systems (SIS) are responsible for the operating safety and ensuring the emergency stop within the limits considered as safe, whenever the operation exceeds such limits. The main objective is to avoid accidents inside and outside plants, such as fires, explosions, equipment damages, protection of production and property and, more than that, avoiding life risk or personal health damages and catastrophic impacts to community. It should be clear that no system is completely immune to failures and, even in case of failure; it should provide a safe condition.

Many process control systems use solenoid operated values for safety functions in 1oo1, 1oo2, 2oo2 and 2oo3 voting architecture. In operation, the solenoid valves of such systems serve to isolate and/or vent off the fluid or pneumatic source from the system when the solenoid valve changes state or position (e.g. when the valve is de-energized by switches or process monitoring sensors coupled thereto). The plant system and any system controlled thereby is then placed in a configuration designated for safety. The voting architecture 1oo1 involves a single channel system, and is normally designed for low level safety applications. Immediately results in the loss of safety function or process closure. There is no redundancy to shut off production in the event that the valve fails. There is also no guarantee that production can be rapidly restored. The voting architecture 1oo2 was developed to improve the performance of safety integrity of safety systems based on 1oo1. If a failure occurs in a channel, the other is still capable of developing a safety function. Unfortunately, such concept does not improve the rate of false trips. Even worst, the probability of false trip is almost doubled. The main disadvantage of a single safety system (that is, non-redundant) is that the only failure immediately leads to a trip. The duplication of channels in a 2oo2 application significantly reduces the probability of a false trip, as both channels have to fail in order the system is placed under shutdown. On the other side, the system has the disadvantage that the probability of failure on demand is twice higher than that of a single channel. In a 2oo3 voting architecture, there are three channels, two requiring being okay in order to operate and comply with safety functions. However, with unplanned interruptions a huge monetary deficit is incurred in lost production, and the significant health, safety and legal issues associated with mechanical problems or systems failure also arise. At present the 2oo3 configuration comprises of four solenoid operated valves (SOV), in which two of the solenoids are given an electrical signal from a common source, to form a 2oo3 logic. Thus, with four number of SOV, there will be more components with a very complex arrangement. So, in case of failure, the reliability of the entire system crumbles and difficult to manage. There are few systems which achieve 2oo3 voting using 3×5/2 valves and its limitations are that for all three valves actuations they cannot provide on signal. Also, with higher number of solenoids the probability of potential electrical hazards increases.

Hence, there is need in the art to design a safety instrumented system that provides both higher level of safety, continuous availability and better reliability with minimum usage of SOVs while also maintaining 2oo3 configuration.

OBJECTS OF THE PRESENT DISCLOSURE

Some of the objects of the present disclosure, which at least one embodiment herein satisfies are as listed herein below.

An object of the present disclosure is to provide a manifold system for facilitating safety and reliability in process control plants.

An object of the present disclosure is to provide a manifold system with reduced complexity by using minimum number of solenoid operated valves.

An object of the present disclosure is to provide a manifold system that intrinsically facilitates an safety.

An object of the present disclosure is to provide a manifold system that avoids connection of at least two solenoids to the same power source thereby reducing probability of potential electrical hazards.

An object of the present disclosure is to provide a manifold system with reduced size by providing an external pilot operated logic valve inside the manifold system.

An object of the present disclosure is to provide a manifold system with reduced chances of joint leakage.

An object of the present disclosure is to provide a manifold system having reduced weight.

An object of the present disclosure is to provide a manifold system that allows online maintenance without interrupting the function of the connected plant.

SUMMARY

The present disclosure relates generally to solenoid valves, and more particularly to an arrangement of solenoid valves providing 2oo3 configuration in instrumentation and process control systems of a plant. Specifically, the present disclosure provides a manifold system that implies reduced number of solenoid valves as compared to conventional manifold systems providing 2oo3 configuration.

In an aspect, the proposed manifold system includes at least three solenoid valves; at least two shuttle valves operatively coupled to the at least three solenoid valves; and an external pilot operated logic control valve operatively coupled to the at least two of the at least three solenoid valves and to at least one of the at least two shuttle valves to provide 2oo3 configuration.

In an embodiment, the manifold system may include three solenoid valves: a first solenoid valve, a second solenoid valve and a third solenoid valve; and two shuttle valves: a first shuttle valve and a second shuttle valve.

In an embodiment, inlet ports of the first solenoid valve and the second solenoid valve may be coupled to an inlet port of the manifold system; outlet ports of the first solenoid valve and the second solenoid valve may be coupled to two inlet ports of the first shuttle valve; outlet port of the first shuttle valve may be coupled to inlet port of the third solenoid valve; and outlet port of the third solenoid valve may be coupled to a first inlet of the second shuttle valve.

In an embodiment, an inlet port of the external pilot operated logic control valve may be coupled to the outlet port of the second solenoid valve; a pilot port of the external pilot operated logic control valve may be coupled to the outlet port of the first solenoid valve; and an output port of the external pilot operated logic control valve may be coupled to a second inlet port of the second shuttle valve.

In an embodiment, outlet port of the second shuttle valve may be coupled to an outlet port of the manifold system In an embodiment, each of the at least three solenoid valves may include pneumatic piloting, and pilot ports of the at least three solenoid valves may be coupled to the inlet port of the manifold system through a non-return valve.

In an embodiment, exhaust ports of the at least three solenoid valves and the external pilot operated logic control valve may be coupled to an exhaust port of the manifold system.

In an embodiment, the manifold system may include at least four visual indicators operatively coupled to outlet ports of the at least three solenoid valves and to an outlet port of the manifold system.

In an embodiment, the manifold system may include an online maintenance valve coupled to the external pilot operated logic control valve to enable maintenance without interrupting functioning of the manifold system. The online maintenance valve comprises any or a combination of a common bypass valve and an individual isolation valve.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure relates generally to solenoid valves, and more particularly to an arrangement of at least three quantity of 3/2 solenoid valves in instrumentation and process control systems of a plant tom provide 2oo3 configuration.

In an embodiment, in the proposed manifold system tripping of any two solenoid valves out of three pertaining to a device operator may trip the system. In an embodiment the proposed manifold system with 2oo3 configuration is based on three solenoid valves and two shuttle valves, and further includes an external pilot operated logic valve to achieve 2oo3 configuration.

As can be understood by those skilled in the art, functionality of the shuttle valves, as implemented herein, can also be achieved by a combination of two check valves in series combination. Therefore, any reference to a shuttle valve includes its implementation by a combination of two check valves arranged in series, and all such implementations are well within the scope of the present disclosure without any limitations whatsoever.

The embodiments of the disclosure would be better explained with the representative figures hereinafter in accordance with the embodiments of the present disclosure.

Figure 1A:
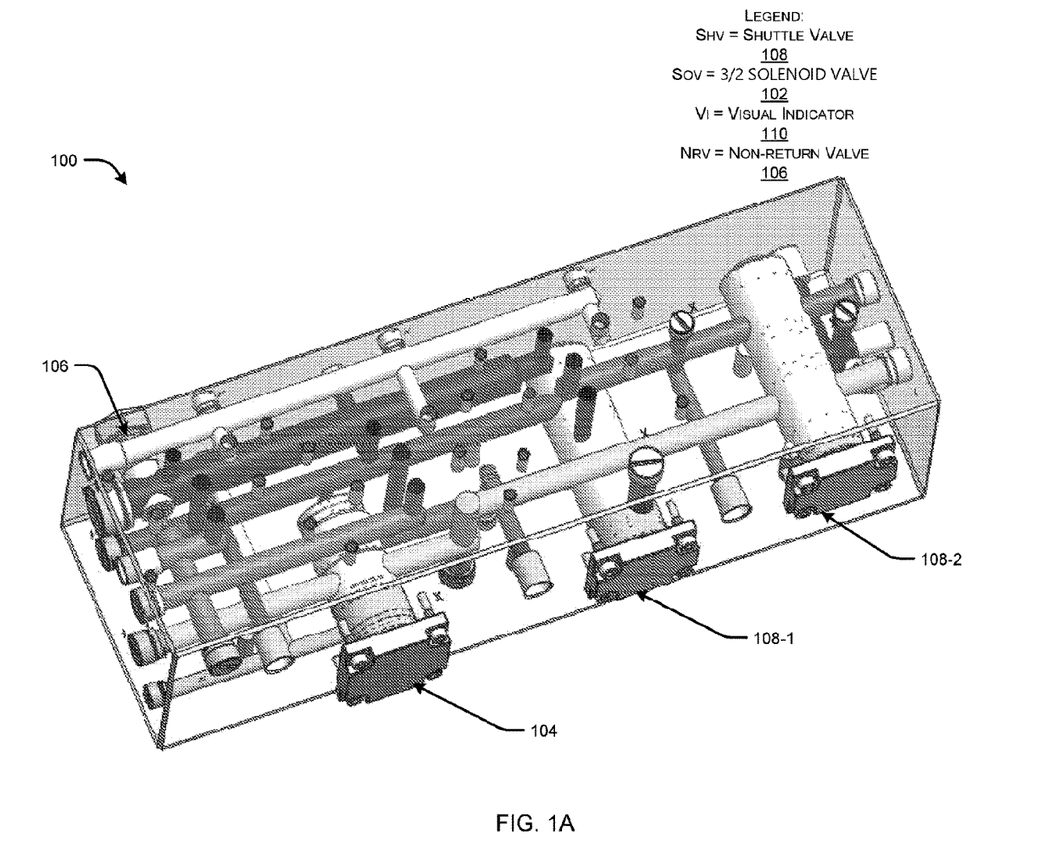
FIGS. 1A-1B illustrate exemplary representations of the proposed manifold system, in accordance with an embodiment of the present disclosure.
Figure 1B:
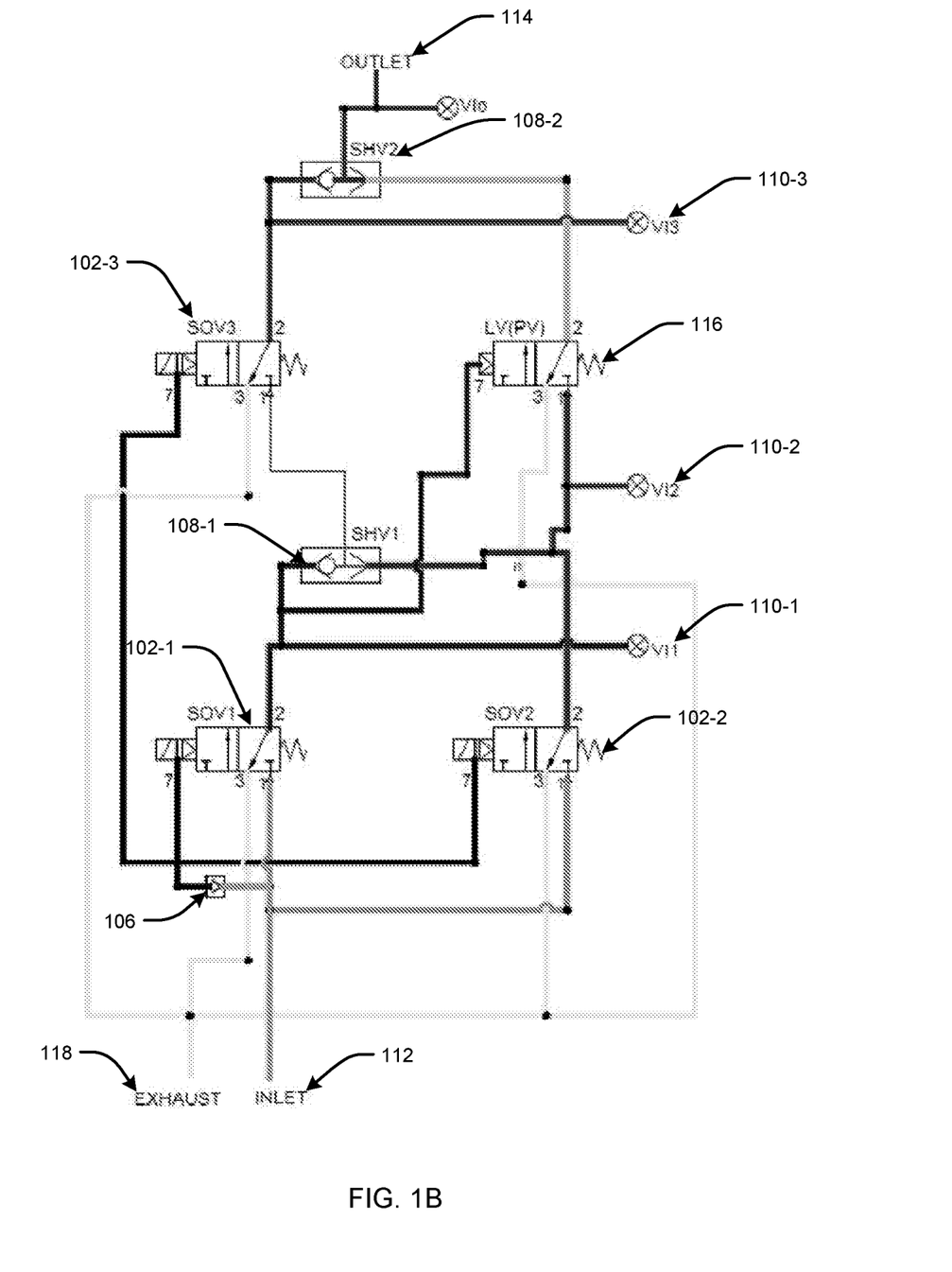

FIG. 1A illustrates an exemplary assembly representation of the manifold system 100, and FIG. 1B illustrates an exemplary representation of a circuit diagram of the proposed manifold system 100. As illustrated, in an embodiment of the present disclosure, the manifold system 100 may include three solenoid valves, such as a first solenoid valve 102-1, a second solenoid valve 102-2 and a third solenoid valve 102-3 (also referred individually as solenoid valve 102 or SOVs 102 and collectively as solenoid valves 102 or SOV 102), each having an inlet port, an outlet port and an exhaust port. The manifold system 100 can further include, two shuttle valves, such as a first shuttle valve 108-1 and a second shuttle valve 108-2 (also referred collectively as shuttle valves 108 or SHVs 108 or individually shuttle valve 108 or SHV 108) operatively coupled to the solenoid valves 102. Each of the solenoid valves 102 includes a first inlet port, a second inlet port and an outlet port.

In an embodiment, any one or all of the shuttle valves 108 can be replaced by a combination of two check valves arranged in series configuration.

In an embodiment, each of the solenoid valves 102 can include pneumatic piloting, and pilot ports of the solenoid valves can be coupled to the inlet port 112 of the manifold system 100 through a non-return valve 106.

In an embodiment, the system 100 may further include an inlet pathway 112 directly extending from an inlet port 112 of the manifold system 100 to a respective inlet ports of the first solenoid valve 102-1 and the second solenoid valve 102-2. Outlet ports of the first solenoid valve 102-1 and the second solenoid valve 102-2 may be fluidically connected to the two inlet ports of the first shuttle valve 108-1. The outlet port of the first shuttle valve 108-1 may be connected to the inlet port of the third solenoid valve 102-3, and outlet port of the first shuttle valve 108-1 may be coupled to a first inlet of the second shuttle valve 108-1. Outlet port of the second shuttle valve 108-1 may be coupled to an outlet port 114 of the manifold system 100.

In an embodiment, the manifold system 100 further includes an external pilot operated logic control valve 116 (also referred to as logic valve 116 or LV 116), with an inlet port of the LV 116 being coupled to the outlet port of the second solenoid valve 102-2, and a pilot port of the LV 116 coupled to outlet port of the first solenoid valve 102-1. Outlet port of the LV 116 can be coupled to the second inlet port of the second shuttle valve 108-2.

The system further may also include an exhaust port 118, and exhaust ports of the three solenoid valves 102 and the LV 116 can be coupled to the exhaust port 118 of the manifold system 100.

The LV 116 regulates the flow of fluid to control the operation of the at least three solenoid valves 102 as a mechanism to interrupt an operation of the system 100 when actuation of at least any two of the first, second and third solenoid valves 102 may fail. The LV 116 may be further coupled to an online maintenance valve configured to provide maintenance without interrupting functioning of the system.

In an embodiment, the LV 116 may be placed inside the manifold assembly system to replace a fourth solenoid valve abolishing a requirement of the fourth solenoid valve and a plurality of sub-assemblies connected to the fourth solenoid valve. In an embodiment, at least four visual indicators 110-1, 110-2, 110-3 and 110-4 (also referred collectively as visual indicators 110 or Vis 110 and individually as visual indicator 110 or VI 110) may be configured to detect presence of air pressure. In an embodiment, visual indicators 110 may provide a visual indication of air pressure within pneumatic systems. Several types of pneumatic visual indicator may be available with high visibility lenses that extend beyond the panel surface to provide a clear visible indication for the presence of air pressure.

In an embodiment, the online maintenance valve may include any or a combination of a common bypass valve and an individual isolation valve but not limited to the like.

Figure 2A:
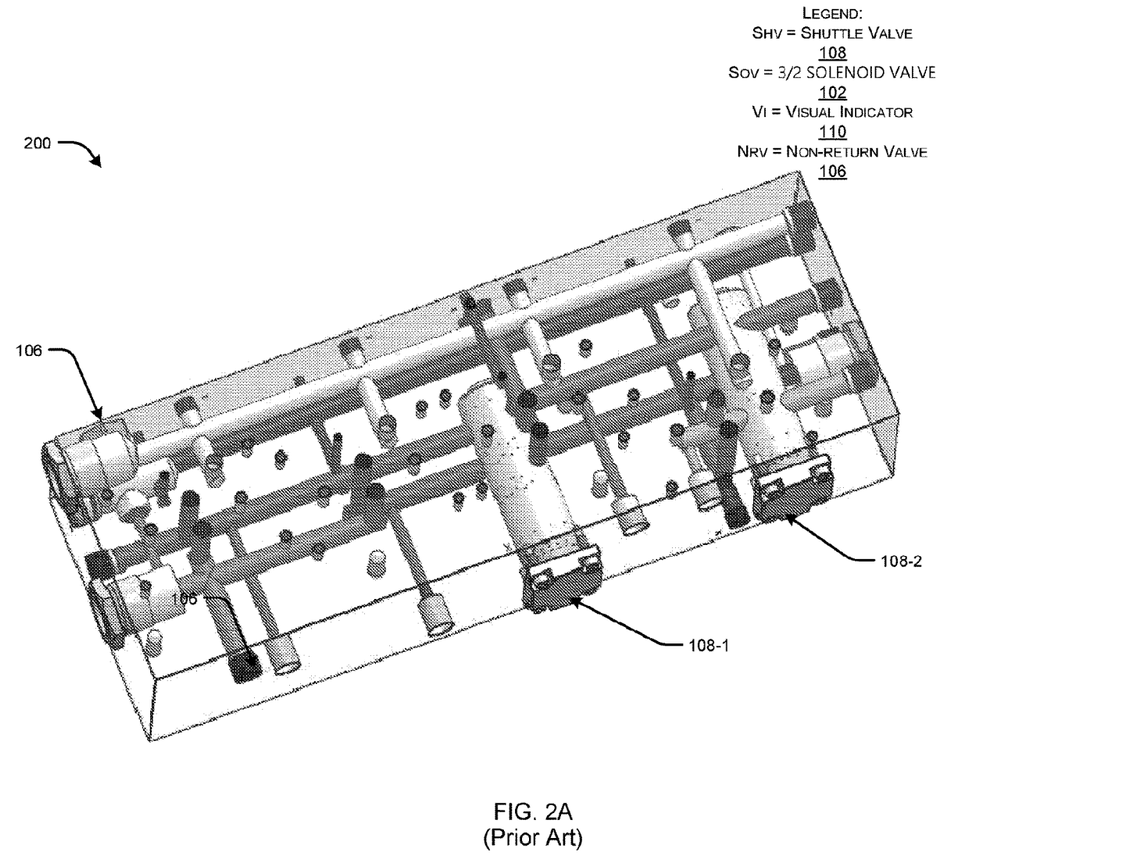
FIGS. 2A-2B illustrate exemplary representations of a conventional manifold system for 2oo3 configuration based on four solenoid valves.
Figure 2B:
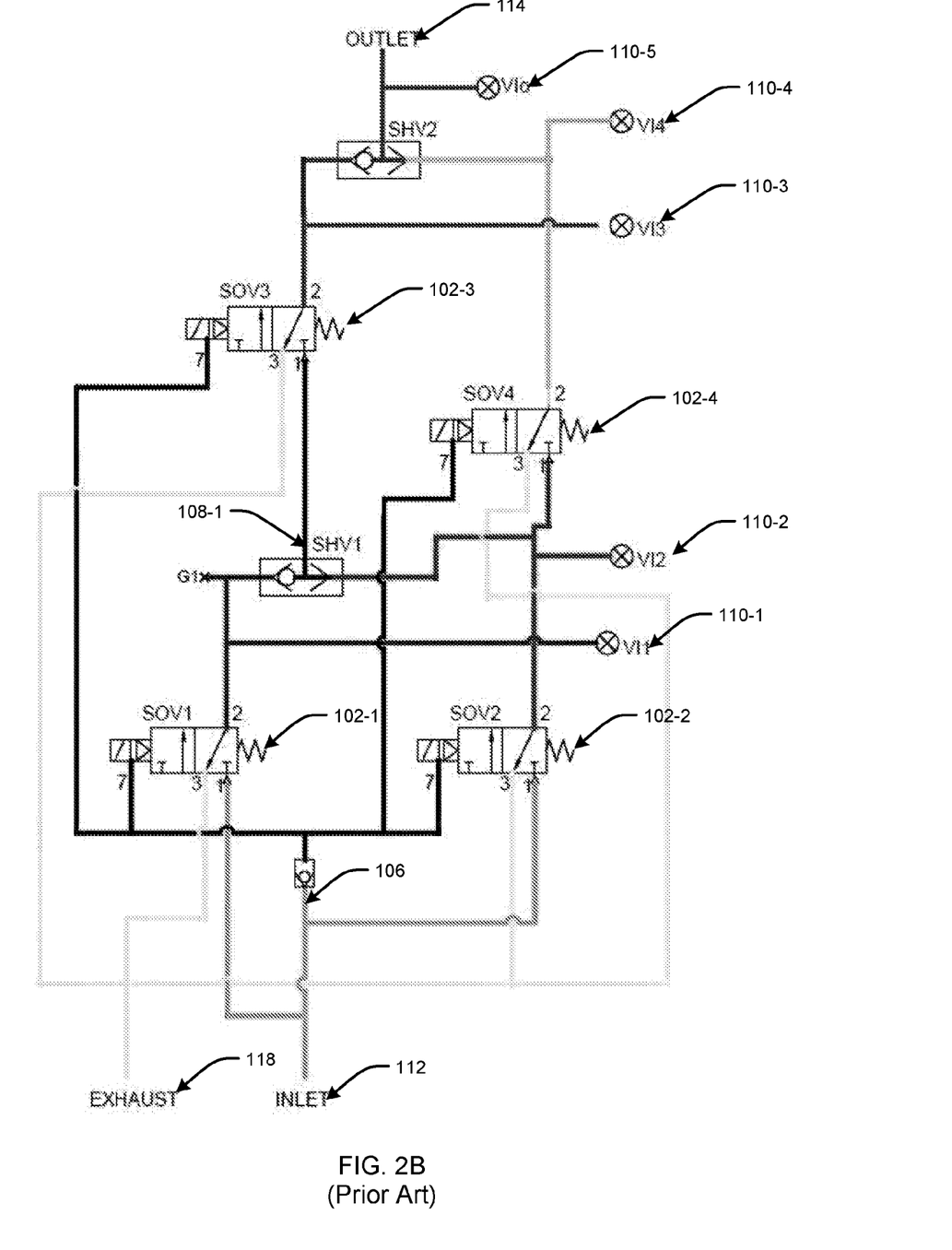

FIGS. 2A-2B illustrate exemplary representations of conventional manifold systems, wherein FIG. 2A illustrates an overall conventional manifold system 200 and FIG. 2B illustrate a circuit diagram of a conventional manifold system 200 for 2oo3 logic.

As illustrated, the conventional manifold system 200 works based on an extra or a fourth solenoid valve 102-4 to form 2oo3 logic, an extra or a fifth visual indicator 110-5 and a plurality of other sub-assemblies connected to the fourth solenoid valve 102-4.

Figure 3A:
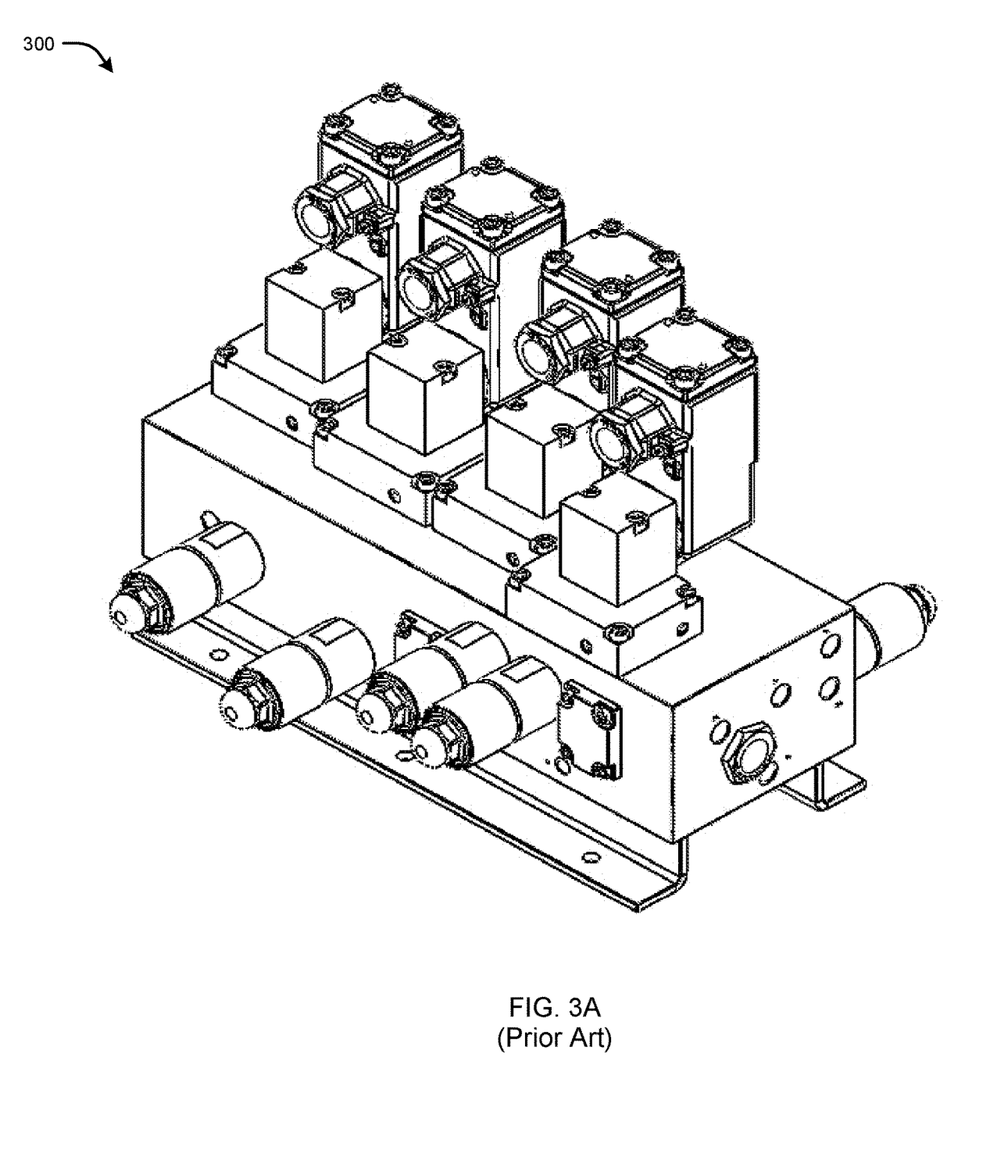
FIGS. 3A-3D illustrate exemplary representations of comparison between a conventional manifold system and the proposed manifold system in accordance with embodiments of the present disclosure.
Figure 3B:
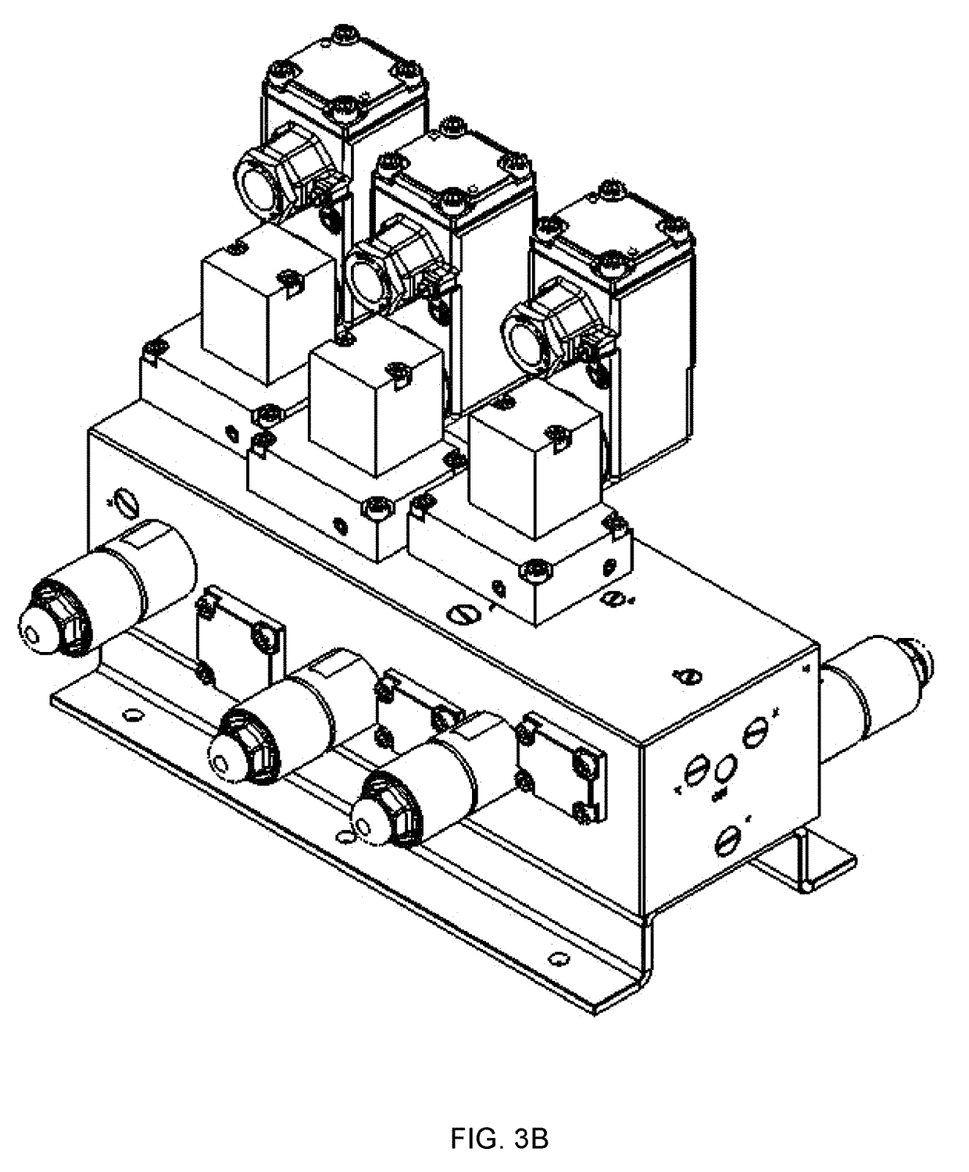
Figure 3C:
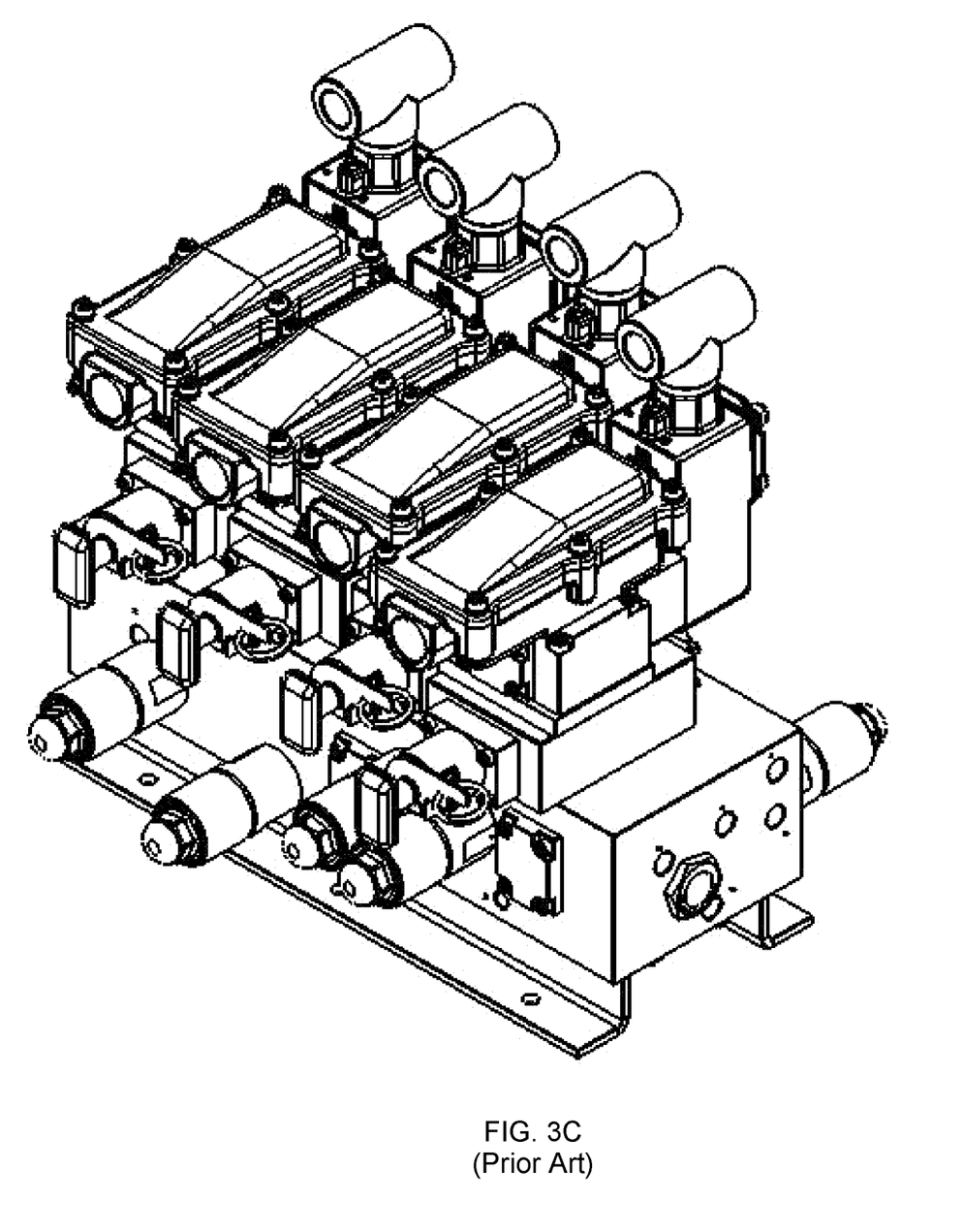
Figure 3D:
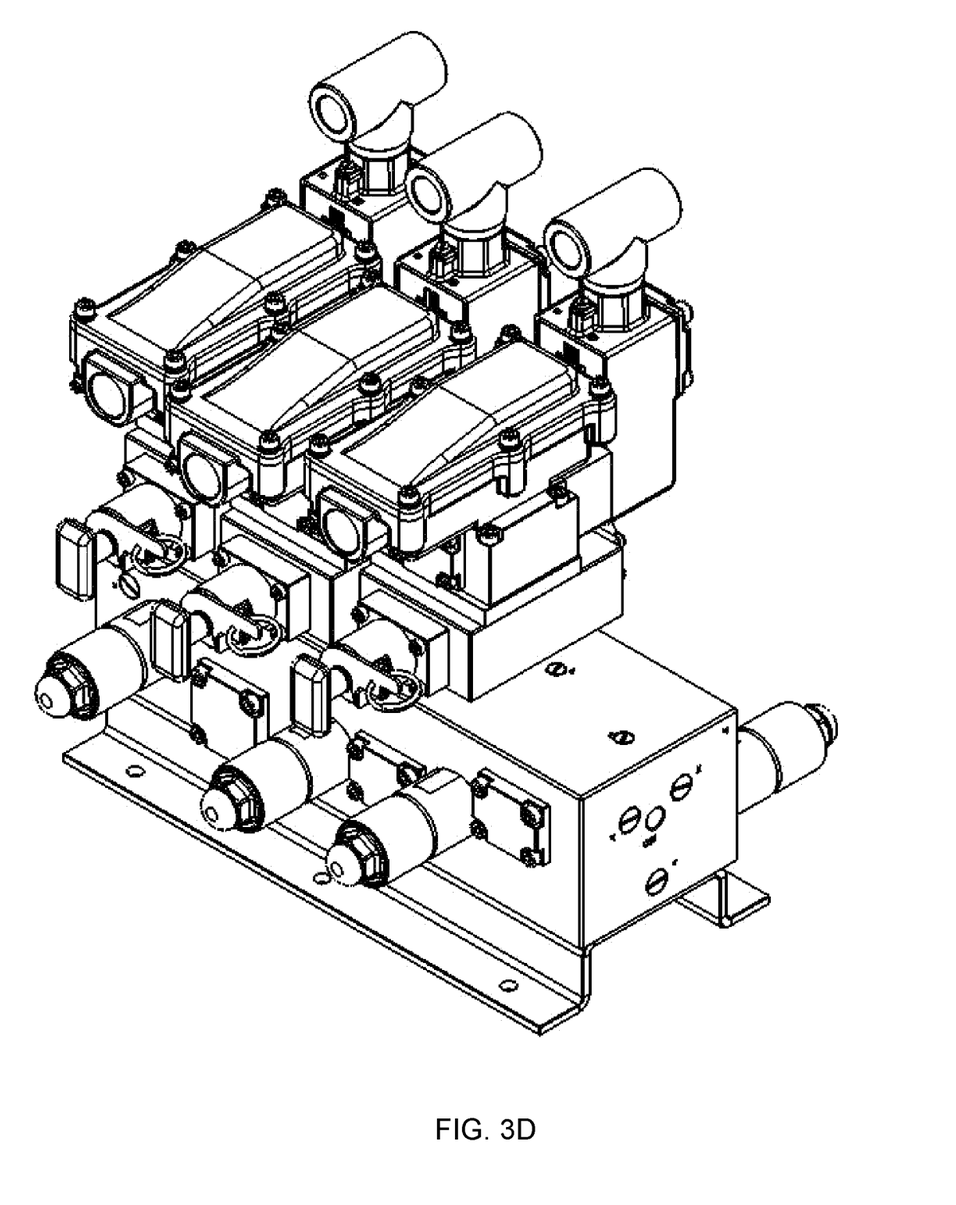

FIGS. 3A-3D illustrate exemplary representations of comparison between the conventional manifold system, shown in FIGS. 2A and 2B, and the proposed system, wherein FIGS. 3A and 3C illustrate the conventional manifold system 200, while FIGS. 3B and 3D illustrate the proposed manifold system 100.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

Advantages of the Present Disclosure

Some of the advantages of the present disclosure, which at least one embodiment herein satisfies are as listed herein below.

The present disclosure provides a manifold system for facilitating safety and reliability in process control plants.

The present disclosure provides a manifold system with reduced complexity by using minimum number of solenoid operated valves.

The present disclosure provides a manifold system that intrinsically facilitates an safety.

The present disclosure provides a manifold system that avoids connection of at least two solenoids to the same power source thereby reducing probability of potential electrical hazards.

The present disclosure provides a manifold system with reduced size by providing a pilot controlled logic valve inside the manifold system. a manifold system with reduced chances of joint leakage.

The present disclosure provides a manifold system having reduced weight.

The present disclosure provides a manifold system that allows online maintenance without interrupting the function of the connected plant.

We claim:

1. A manifold system comprising:
   at least three solenoid valves;
   at least two shuttle valves operatively coupled to the at least three solenoid valves; and
   an external pilot operated logic control valve operatively coupled to at least two of the at least three solenoid valves and to at least one of the at least two shuttle valves to provide 2oo3 configuration.

2. The manifold system as claimed in claim 1, wherein the at least three solenoid valves comprise three solenoid valves comprising: a first solenoid valve, a second solenoid valve and a third solenoid valve each having an inlet port and an outlet port; and wherein the at least two shuttle valves comprise two shuttle valves comprising: a first shuttle valve and a second shuttle valve, each having a first inlet, a second inlet and an outlet.

3. The manifold system as claimed in claim 2, wherein: the inlet ports of the first solenoid valve and the second solenoid valve are coupled to an inlet port of the manifold system; the outlet ports of the first solenoid valve and the second solenoid valve are coupled to the first and second inlets of the first shuttle valve; the outlet of the first shuttle valve is coupled to the inlet port of the third solenoid valve; and the outlet port of the third solenoid valve is coupled to the first inlet of the second shuttle valve.

4. The manifold system as claimed in claim 3, wherein: an inlet port of the external pilot operated logic control valve is coupled to the outlet port of the second solenoid valve; a pilot port of the external pilot operated logic control valve is coupled to the outlet port of the first solenoid valve; and an output port of the external pilot operated logic control valve is coupled to the second inlet of the second shuttle valve.

5. The manifold system as claimed in claim 4, wherein the outlet of the second shuttle valve is coupled to an outlet port of the manifold system.

6. The manifold system as claimed in claim 1, wherein each of the at least three solenoid valves includes pneumatic piloting, and wherein pilot ports of the at least three solenoid valves are coupled to an inlet port of the manifold system through a non-return valve.

7. The manifold system as claimed in claim 1, wherein exhaust ports of the at least three solenoid valves and the external pilot operated logic control valve are coupled to an exhaust port of the manifold system.

8. The manifold system as claimed in claim 2, wherein the manifold system comprises at least four visual indicators operatively coupled to the outlet ports of the at least three solenoid valves and to an outlet port of the manifold system.

9. The manifold system as claimed in claim 1, wherein the manifold system comprises an online maintenance valve coupled to the external pilot operated logic control valve to enable maintenance without interrupting functioning of the manifold system.

10. The manifold system as claimed in claim 9, wherein the online maintenance valve comprises any or a combination of a common bypass valve and an individual isolation valve.

* * * * *